(12) United States Patent
Kim et al.

(10) Patent No.: US 7,309,737 B2
(45) Date of Patent: Dec. 18, 2007

(54) ACRYLIC PRESSURE SENSITIVE ADHESIVE

(75) Inventors: Se-ra Kim, Daejeon (KR); Hye-ran Seong, Daejeon (KR); In-cheon Han, Seoul (KR); Suk-ky Chang, Daejeon (KR)

(73) Assignee: LG Chem Ltd., Seoul (KR)

( * ) Notice: Subject to any disclaimer, the term of this patent is extended or adjusted under 35 U.S.C. 154(b) by 302 days.

(21) Appl. No.: 11/199,385

(22) Filed: Aug. 9, 2005

(65) Prior Publication Data

US 2006/0035076 A1    Feb. 16, 2006

(30) Foreign Application Priority Data

Aug. 10, 2004    (KR)    ............... 10-2004-0062821

(51) Int. Cl.
 *C08F 8/00*    (2006.01)
(52) U.S. Cl. .............. 525/100; 546/14; 556/413; 556/418; 556/419; 556/420; 526/318.4
(58) Field of Classification Search .......... None
 See application file for complete search history.

(56) References Cited

U.S. PATENT DOCUMENTS 6,020,408 A * 2/2000 Suzuki et al. ............ 524/265

2005/0277774 A1* 12/2005 Seong et al. ............ 546/14

FOREIGN PATENT DOCUMENTS

| JP | 04-223403 | 8/1992 |
| JP | 8-104855 | 4/1996 |
| JP | 8-199144 | 8/1996 |

OTHER PUBLICATIONS

Abstract of JP 2003-193014 A.*
Abstract of JP 10-140119 A.*

* cited by examiner

*Primary Examiner*—Marc S. Zimmer
(74) *Attorney, Agent, or Firm*—McKenna Long & Aldridge LLP

(57) ABSTRACT

The present invention relates to an acrylic pressure sensitive adhesive composition containing organic functional groups of urethane and pyridine, more precisely an acrylic pressure sensitive adhesive composition which has excellent removability owing to its low initial peel strength on glass and excellent long-term durability since the peel strength of the pressure sensitive adhesive composition onto glass is being increased under high temperature and high humidity. The present invention also relates to an acrylic pressure sensitive adhesive composition for a polarizer having excellent adhesive functions and durability, a polarizer and a LCD containing the same.

10 Claims, 1 Drawing Sheet

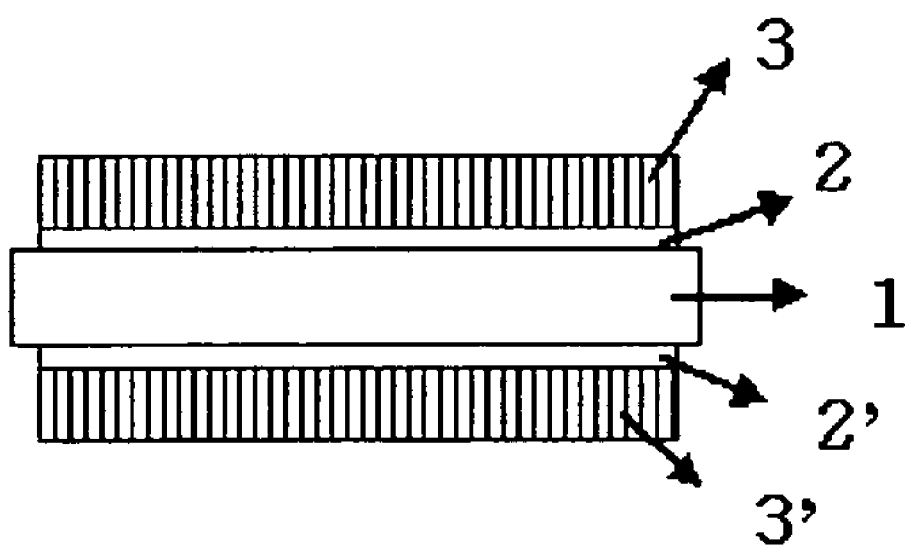

ACRYLIC PRESSURE SENSITIVE ADHESIVE

This application claims priority to Korean Patent Application No. 10-2004-0062821, filed Aug. 10, 2004, which is hereby incorporated by reference.

TECHNICAL FIELD

The present invention relates to an acrylic pressure sensitive adhesive composition, more precisely, an acrylic pressure sensitive adhesive which has excellent removability from glass in the early stage owing to the low initial peel strength and has excellent long-term durability since the peel strength of the pressure sensitive adhesive composition onto glass is being increased under high temperature and high humidity. The present invention also relates to an acrylic pressure sensitive adhesive for polarizer having excellent adhesive property and durability, and a polarizer and a liquid crystal display using the same.

BACKGROUND ART

Liquid crystal display (LCD) is in great demand because of the spread of mobile computer and the expansion of cellular phone market triggered by multi-functional cellphone. With the progress of high density packaging technique, LCD realizes slimness and miniaturization, and at the same time the LCD screen becomes bigger and wider.

It was doubtful at the beginning that large screen over 20 inches of LCD would be realized, but in fact the screen becomes larger and larger very fast. Up to now, major LCD makers have tried to produce small panel less than 20 inches, but they are going to expand rapidly their production range over 20 inches by taking advantage of high technology.

So, the glass used for the production of LCD screen is becoming larger. When there is something inferior in a product in early lamination stage, optical film has to be removed and liquid crystal cells are washed to be reused. At this time, a conventional pressure sensitive adhesive with high peel strength makes the peeling of optical film difficult and further makes high priced LCD cells destroyed.

Thus, efforts have been made to develop a high functional pressure sensitive adhesive which is fitted for the production of larger LCD. As a reference, Japanese Patent No. 3022993 describes acrylic pressure sensitive adhesive composition containing silane compound having epoxy available for the production of polarizer having excellent durability under high temperature and high humidity.

However, when silane compound having epoxy is applied to a pressure sensitive adhesive containing carboxyl (—COOH), removability is so bad to destroy liquid crystal cell because of its high peel strength. Thus, it is required a pressure sensitive adhesive composition showing not only excellent removability in the early adhesive stage when it is applied to a pressure sensitive adhesive containing any kind of functional group, for example carboxyl (—COOH) or hydroxyl (—OH), but also excellent durability in the late stage which is increased under high temperature and high humidity.

Japanese Patent Publication No. 8-104855 describes a pressure sensitive adhesive composition prepared by binding acrylic polymer with silane compound containing β-keto ester and alkoxy, which shows good peel strength to adhere polarizer on the surface of substrate and at the same time enables peeling of the polarizer out of the surface of substrate without damage of the substrate or leaving the adhesive.

The above Patent Publication describes that the addition of silane compound maintains the proper peel strength for the adhesion of polarizer onto substrate, keeps the peel strength at the level not to be over-strengthened, even by heat, and enables removal of polarizer without damage of liquid crystal device.

In order to be fitted for the production of larger LCD screen, a pressure sensitive adhesive should have low initial peel strength for possible removal, but have excellent peel strength later under high temperature or high temperature and high humidity, otherwise durability is in doubt, accompanying bubbles or edge lifting.

It is also described in Japanese Patent Publication No. 8-199144 that acrylic resin produced from polymerization of acrylic monomer in the presence of silane compound is mixed with crosslinking agent to provide a pressure sensitive adhesive composition having cohesive force and peel strength with less variation by high temperature or high temperature and high humidity and having excellent peel strength even on a curved surface.

It further describes that by the addition of silane compound, the peel strength can be properly maintained to hold polarizer on the surface of substrate, which is not overstrengthened, though, to make peeling of polarizer possible without damage of liquid crystal device.

It is better for a pressure sensitive adhesive composition to have excellent durability not carrying bubbles or edge lifting than to have cohesion and peel strength with less variation under high temperature or high temperature and high humidity. That is, it is preferred that the peel strength in the early stage of adhesion onto glass is just as good as removability is possible, but it gets higher as time goes by to keep strong and stable peel strength since there is no need of peeling in the late stage.

DISCLOSURE OF THE INVENTION

Thus, it was required to develop a pressure sensitive adhesive having low initial peel strength in the early stage of adhesion onto glass for possible removability but increasing peel strength showing excellent long term durability under high temperature or high temperature and high humidity.

Therefore, it is an object of the present invention to provide an acrylic pressure sensitive adhesive composition having low initial peel strength in the early stage of adhesion onto glass for possible removability but increasing peel strength showing excellent long term durability under high temperature or high temperature and high humidity.

It is another object of the present invention to provide a polarizer prepared by using the acrylic pressure sensitive adhesive composition and a liquid crystal display to which the polarizer of the invention is applied.

The above objects of the present invention can be achieved by the preferred embodiments of the invention described hereinafter.

The present inventors have made every effort to develope a high functional pressure sensitive adhesive to be used for the production of general LCD screens. As a result, the inventors developed an acrylic pressure sensitive adhesive composition having low initial peel strength in the early stage of adhesion on glass for possible removability but increasing peel strength showing excellent long-term durability under high temperature or high temperature and high humidity by using silane compound having organic functional groups of urethane and pyridine.

The present invention provides an acrylic pressure sensitive adhesive composition containing silane compound harboring organic functional groups of urethane and pyridine, represented by the following formula 1. Silane compound having organic functional groups of urethane and pyridine is described below.

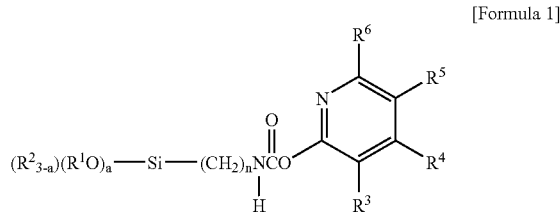

[Formula 1]

Wherein, R1 and R2 are independently H or C1-C3 alkyl, a is an integer of 0-3, R3, R4, R5 and R6 are independently H or C1-C10 alkyl, alkoxyalkyl, and n is an integer of 1-3.

More precisely, the present invention provides an acrylic pressure sensitive adhesive resin composition containing, a) 100 weight part of acrylic copolymer prepared by copolymerization of (meth)acrylic acid ester monomer having C1-C12 alkyl by 90-99.9 weight part and vinyl and/or acrylic monomer having a functional group capable of crosslinking by 0.1-10 weight part;

b) 0.01-10 weight part of multifunctional crosslinking agent; and c) 0.01-5 weight part of silane compound having organic functional groups of urethane and pyridine represented in formula 1.

The present invention also provides a polarizer containing the above acrylic pressure sensitive adhesive composition as an adhesive layer on one side or both sides of polarizing film.

The polarizer can additionally contain one or more layers selected from a group consisting of protective layer, reflecting layer, phase retardation film, compensation film for wide view angle and brightness enhancing film.

The present invention further provides a liquid crystal display containing liquid crystal panel in which above polarizer is adhered on one side or both sides of liquid crystal cell. FIG. 1 is a cross-section showing the structure of liquid crystal display containing the pressure sensitive adhesive of the present invention.

Hereinafter, the present invention is described in detail.

An acrylic pressure sensitive adhesive containing silane compound having organic functional groups of urethane and pyridine has low initial peel strength in the early stage of adhesion onto glass for possible removability but increasing peel strength as time goes by showing excellent long-term durability under high temperature or high temperature and high humidity. Although the peel strength is incresing, as time goes by, under high temperature or high temperature and high humidity, transfer through the glass is not occured.

Each component of the pressure sensitive adhesive composition of the present invention is described in detail hereinafter.

The present invention provides an acrylic pressure sensitive adhesive composition containing silane compound having organic functional groups of urethane and pyridine.

In the present invention, it is preferred that (meth)acrylic acid ester monomer having C1-C12 alkyl is included by 90-99.9 weight part for 100 weight part of the acrylic copolymer. When the content is lower than 90 weight part, the initial peel strength is decreased, and when the content is higher than 99.9 weight part, cohesion becomes dropped, resulting in the low durability.

As a (meth)acrylic acid ester monomer having C1-C12 alkyl, C1-C12 alkyl ester can be used. In particular, C2-C8 alkyl ester is preferred. When alkyl of the alkyl(meth)acrylate is in the form of long chain, cohesion of the adhesive drops. Thus, to maintain the cohesion under high temperature, C1-C12 alkyl is preferably used, and C2-C8 alkyl is more preferred.

The (meth)acrylic acid ester monomer having C1-C12 alkyl is exemplified by butyl(meth)acrylate, 2-ethylhexyl (meth)acrylate, ethyl(meth)acrylate, methyl(meth)acrylate, n-propyl(meth)acrylate, isopropyl(meth)acrylate, t-butyl (meth)acrylate, pentyl(meth)acrylate, n-octyl(meth)acrylate, isooctyl(meth)acrylate, or isononyl(meth)acrylate, etc, and these can be used independently or jointly.

In the present invention, copolymer monomer can be additionally included in acrylic copolymer to regulate the of glass transition temperature of a pressure sensitive adhesive or to endow other functional properties thereto. At this time, monomers such as acrylonitrille, styrene, glycidyl(meth) acrylate or vinylacetate are preferably used.

Vinyl monomer and acrylic monomer containing functional groups capable of crosslinking endow cohesion or peel strength by chemical bond not to destroy cohesion of a pressure sensitive adhesive by high temperature or high humidity by reacting with other crosslinking agents. The preferable content of vinyl monomer and acrylic momoner or the mixture of them containing functional group capable of crosslinking, is 0.1-10 weight part.

When the content of a monomer containing functional groups capable of crosslinking is less than 0.1 weight part, the cohesion is easily broken under high temperature or high humidity, resulting in the lowering effect on peel strength. On the contrary, when the content of such monomer is more than 10 weight part, compatibility is remarkably decreased, causing surface migration, fluidity is reduced and cohesion is increased, losing stress relaxation.

The monomer containing functional groups capable of crosslinking is exemplified by monomers containing hydroxy such as 2-hydroxyethyl(meth)acrylate, 2-hydroxyethyleneglycol(meth)acrylate, 4-hydroxybutyl(meth)acrylate, 2-hydroxyethyleneglycol(meth)acrylate, 2-hydroxypropyleneglycol(meth)acrylate, and monomers containing carboxylic acid such as acrylic acid, methacrylic acid, acrylic acid dimer, itaconic acid, maleic acid, and maleic anhydride, etc, but not always limited thereto. These monomers can be used independently or jointly.

It is preferred to eliminate factors generating bubbles such as volatile components, reaction residues, etc, from a pressure sensitive adhesive, before using. When elastic modulus of a pressure sensitive adhesive is too low, resulted from low crosslinking density or molecular weight, bubbles generated between glass substrate and adhesive layer at high temperature are growing to form a scatterer in inside of the adhesive layer. In the meantime, when a pressure sensitive adhesive with high elastic modulus is applied, edge lifting is observed at the end of adhesive sheet, resulted from excessive crosslinking reaction.

The viscoelastic property of a pressure sensitive adhesive depends on molecular weight of polymer chain, distribution of molecular weight, or abundant number of molecular structure, and in particular it might be determined by molecular weight. Thus, the preferable molecular weight of acrylic copolymer used in the present invention is 800,000-2,000,000, and the copolymer of the invention can be prepared by the conventional radical copolymerization.

A method for polymerization of acrylic copolymer of the present invention is not limited to a specific one but solution polymerization, photo-polymerization, bulk polymerization, suspension polymerization, and emulsion polymerization are preferred and in particular solution polymerization is more preferred. It is also preferred to set the temperature between 50-140° C., and to add an intiator after monomers are evenly mixed.

In the pressure sensitive adhesive composition of the present invention, the multifunctional crosslinking agent of the above b) increases cohesion of the pressure sensitive adhesive by reacting with carboxyl and hydroxy. The preferable content of the crosslinking agent is 0.01-10 weight part for 100 weight part of acrylic copolymer of a).

The multifunctional crosslinking agent can be selected among isocyanate, epoxy, aziridine, metal chelate crosslinking agents, etc., and in particular isocyanate crosslinking agent is preferred. Isocyanate crosslinking agent is exemplified by tolylene diisocyanate, xylene diisocyanate, diphenylmethane diisocyanate, hexamethylene diisocyanate, isoform diisocyanate, tetramethyl xylene diisocyanate, naphthalene diisocyanate, and their reactants with polyol like trimethylolpropane, etc.

The epoxy crosslinking agent is exemplified by ethyleneglycol diglycidylether, triglycidylether, trimethylolpropane triglycidylether, N,N,N'N'-tetraglycidylethylenediamine, glycerine diglycidylether, etc.

The aziridine crosslinking agent is exemplified by N,N'-toluene-2,4-bis(1-aziridinecarboxide), N,N'-diphenylmethane-4,4'-bis(1-aziridinecarboxide), triethylenemelamine, bisisoprotaloyl-1-(2-methylaziridine), tri-1-aziridinylphosphineoxide, etc.

As metal chelate crosslinking agent, compounds prepared by coordination of multivalent metal such as Al, Fe, Zn, Sn, Ti, Sb, Mg, and V with acethylacetone or ethyl acetoacetate can be used.

A preparation method of the pressure sensitive adhesive composition of the present invention is not limited to a specific one but in general, it is produced by mixing an acrylic copolymer and a crosslinking agent.

At this time, a crosslinking reaction of functional groups of a crosslinking agent must not be induced for even coating during the mixing process to form adhesive layer. After coating, a crosslinking structure is formed through drying and aging, resulting in an adhesive layer having a strong elasticity and cohesion. By the strong cohesion, adhesive property such as durability and cutting characteristic of a pressure sensitive adhesive product are enhanced.

The acrylic pressure sensitive adhesive containing silane compound having organic functional groups of urethane and pyridine of the above C) has low initial peel strength in the early stage of adhesion onto glass for possible removability but increasing peel strength as time goes by showing excellent long-term durability under high temperature or high temperature and high humidity.

The preferable content of silane compound having organic functional groups of urethane and pyridine, represented by formula 1, is 0.01-5 weight part for 100 weight part of an acrylic copolymer. When the content is less than 0.01 weight part, the peel strength onto glass is not increased much under high temperature or high humidity. In the meantime, the over-dose of more than 5 weight part causes bubbles or edge lifting, resulting in the decrease of durability.

The Silane compound containing organic functional groups of urethane and pyridine can be added during the mixing process after polymerization of an acrylic copolymer, or be added during the preparing process of an acrylic copolymer, and the effects are the same for both cases.

The silane compound containing organic functional groups of urethane and pyridine is represented by the following formula 1.

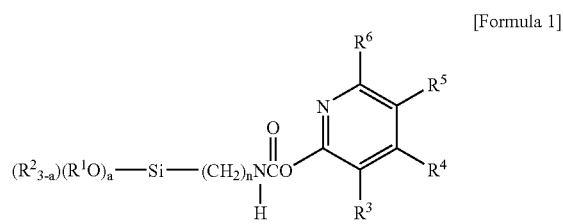

[Formula 1]

Wherein, R1 and R2 are independently H or C1-C3 alkyl, a is an integer of 0-3, R3, R4, R5 and R6 are independently H or C1-C10 alkyl, alkoxyalkyl, and n is an integer of 1-3.

The preferred embodiments of silane compound having organic functional groups of urethane and pyridine are presented in formula 2 and formula 3, and such silane compounds can be used independently or jointly.

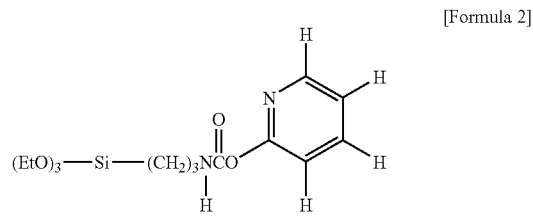

[Formula 2]

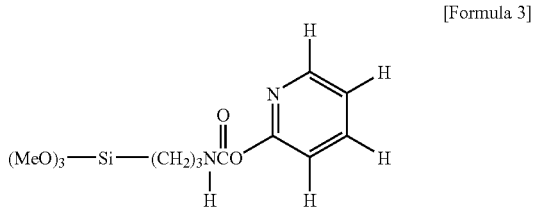

[Formula 3]

The proper crosslinking density of the acrylic pressure sensitive adhesive composition of the present invention is 5-95%, for the optimum physical balance. The crosslinking density is calculated by the conventional quantification method of gel content in acrylic pressure sensitive adhesive, which calculates the parts forming a crosslinking structure insoluble in a solvent by weight %. When the crosslinking density of the pressure sensitive adhesive is under 5%, cohesion of the pressure sensitive adhesive is reduced, causing weakness of durability to form bubbles or edge lifting. On the contrary, when the crosslinking density is over 95%, durability is remarkably reduced.

To regulate the adhesive property, a tackifier can be additionally added to the pressure sensitive adhesive of the present invention, and the content thereof is determined in the range of 1-100 weight part for 100 weight part of an acrylic copolymer. At this time, when the pressure sensitive adhesive resin is over-treated, compatibility and cohesion of a pressure sensitive adhesive decrease, so the content of the pressure sensitive adhesive resin has to be properly regulated.

The pressure sensitive adhesive resin is exemplified by (hydrogenated)hydrocarbon resin, (hydrogenated)rosin resin, (hydrogenated)rosinester resin, (hydrogenated)terpene resin, (hydrogenated)terpenetenol resin, polymerized rosin resin, and polymerized rosinester resin, etc, and these resins can be used singly or jointly.

In addition, to achieve the objects of the present invention, plasticizers, low molecular weight polymer, epoxy resins and hardners can be additionally included. UV stabilizers, antioxidants, coloring agents, reinforcing agents, fillers, antifoaming agents, and surfactants can also be added.

The present invention further provides a polarizer containing the acrylic pressure sensitive adhesive composition as an adhesive layer of polarizing film.

The polarizer of the present invention has an adhesive layer formed from the pressure sensitive adhesive composition of the invention on one side or both sides of the polarizing film. Polarizing film or polarizing device forming polarizer is not limited to a specific one.

However, it is preferred to prepare the polarizing film by elongation by adding a polarizing component such as iodine or dichroic dye onto polyvinyl alcohol resin film, and there is no limitation in thickness of polarizing film, which is conventional thickness of film, is accepted.

As a polyvinyl alcohol resin, polyvinyl alcohol, polyvinyl formal, polyvinyl acetal and ethylene, saponified vinyl acetate copolymer, etc can be used.

On both sides of the polarizing film, protective films are laminated to form a multi-layer film, and the protective films are cellulose film such as triacetyl cellulose, etc, polyester film such as polycarbonate film, polyethylene terephthalate, etc, polyether sulphone film, polyolefin film including those having the structure of polyethylene, polypropylene, cyclo or norbornene, and ethylene propylene copolymer. The thickness of such protective films is not fixed and conventional thickness of film is accepted.

A method for forming adhesive layer on polarizing film is not limited, either, but generally, a method comprising the steps of coating the pressure sensitive adhesive directly on the surface of the polarizing film with Bar Coater and then drying thereof, or a method comprising the steps of coating the pressure sensitive adhesive on the surface of dissecting substrate, drying, transfer of the adhesive layer formed on the surface of the dissecting substrate onto the surface of polarizing film, and aging is applicable.

The polarizer of the present invention can include one or more additional layers providing supplementary functions, which might be protective layer, reflecting layer, phase retardation film, compensation film for wide view angle and brightness enhancing film.

The polarizer loaded with the pressure sensitive adhesive of the present invention can be applied to every LCD generally used, and liquid crystal panel is not limited. It is preferred in the present invention to construct LCD including liquid crystal panel prepared by conjugating the adhesive polarizer to one side or both sides of liquid crystal cell.

FIG. 1 is a cross-section showing the structure of LCD containing the pressure sensitive adhesive of the present invention.

The acrylic pressure sensitive adhesive resin composition of the present invention can be widely used without limitation, for example for industrial sheet in particular reflective sheet, structural adhesive sheet, photographic adhesive sheet, lane marking adhesive sheet, optical adhesive product, adhesive for electronic components, etc. The pressure sensitive adhesive composition can also be applied to the equal operating field such as to the production of multi-layer laminate products, for example general industrial adhesive sheet products, medical patchs, heat activated pressure sensitive adhesives, etc.

As explained hereinbefore, the pressure sensitive adhesive of the present invention is an acrylic pressure sensitive adhesive containing silane compound having organic functional groups of urethane and pyridine, which has good removability owing to the low initial peel strength and excellent long-term durability since its peel strength is increasing under high temperature or high temperature and high humidity as time goes by.

BRIEF DESCRIPTION OF DRAWINGS

FIG. 1 is a cross-section showing the structure of LCD containing the pressure sensitive adhesive of the present invention.

1: Liquid crystal panel
2, 2': Pressure sensitive adhesive
3, 3': Polarizer

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

Preparation of an Acrylic Copolymer

A monomer mixture composed of 98.1 weight part of n-butylacrylate (BA), 0.6 weight part of acrylic acid (AA), and 1.3 weight part of 2-hydroxyethylmethacrylate (2-HEMA) is put in a 1 L reactor equipped with cooling system for the reflux of nitrogen gas and the regulation of temperature, to which 100 weight part of ethyl acetate (EAc) was added as a solvent.

To remove oxygen therefrom, nitrogen gas was purged for 1 hour, during which the temperature was kept at 62° C.

After homogenization, azobisisobutyronitrile (AIBN), which was 50% diluted in ethyl acetate, was added as a reaction initiator by 0.03 weight part. The mixture was reacted for 8 hours, resulting in an acrylic copolymer.

Mixing Process

To 100 weight part of the acrylic copolymer prepared above, 0.5 weight part of tolylene diisocyanate adduct (TDI-1) of trimethylolpropane, a crosslinking agent, and 1.0 weight part of the silane compound represented by formula 2 were added. The mixture was diluted properly considering better chance of coating, followed by homogenization. After coating on releasing paper, the mixture was dried, resulting in an even adhesive layer in thickness of 25 micron.

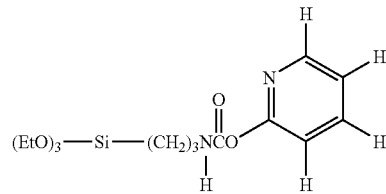

[Formula 2]

Laminating Process

The pressure sensitive adhesive layer prepared above was processed on iodine polarizer in thickness of 185 micron, then the polarizer was cut for examiniation.

Durability, peel strength, removability, and variation of peel strength under high temperature or high temperature and high humidity of the polarizer, to which the pressure sensitive adhesive of the invention was applied, were investigated by the following methods and the results are shown in Table 2-Table 4.

EXAMPLES 2-5

An acrylic copolymer was prepared by the method of Example 1 with the same composition as shown in Table 1. The preparting, mixing, and laminating processes were basically the same as described in Example 1, except some of components were included by different amount or different components were added.

Durability, peel strength, removability, and variation of peel strength under high temperature or high temperature and high humidity of the polarizer, to which the pressure sensitive adhesive of the invention was applied, were investigated by the following methods and the results are shown in Table 2-Table 4.

COMPARATIVE EXAMPLES 1-3

An acrylic copolymer was prepared by the method of Example 1 with the same composition as shown in Table 1. The preparting, mixing, and laminating processes were basically the same as described in Example 1, except some of components were included by different amount or different components were added.

Durability, peel strength, removability, and variation of peel strength under high temperature or high temperature and high humidity of the polarizer, to which the pressure sensitive adhesive of the invention was applied, were investigated by the following methods and the results are shown in Table 2-Table 4.

TABLE 1

|  |  | Ex. 1 | Ex. 2 | Ex. 3 | Ex. 4 | Ex. 5 | Comparative Ex. 1 | Comparative Ex. 2 | Comparative Ex. 3 |
|---|---|---|---|---|---|---|---|---|---|
| Copolymer composition | n-BA | 98.1 | 98.1 | 98.1 | 90.2 | 92.7 | 98.1 | 98.1 | 92.7 |
|  | EA |  |  |  | 7.8 | 5.3 |  |  | 5.3 |
|  | AA | 0.6 | 0.6 | 1.2 |  |  | 0.6 | 1.2 |  |
|  | 2-HEMA | 1.3 | 1.3 | 0.7 |  | 2.0 | 1.3 | 0.7 | 2.0 |
|  | 4-HBA |  |  |  | 2.0 |  |  |  |  |
| Mixing composition | Crosslinking agent TDI-1 | 0.5 | 0.5 | 0.5 | 0.5 | 0.5 | 0.5 | 0.5 | 0.5 |
|  | silane A-1 | 1.0 | 2.0 | 0.02 | 0.99 |  |  |  |  |
|  | silane A-2 |  |  |  | 0.01 | 1.0 |  |  |  |
|  | silane B |  |  |  |  |  |  | 0.2 |  |
|  | silane C |  |  |  |  |  |  |  | 0.2 | n-BA: n-butylacrylate
EA: ethylacrylate
2-HEMA: 2-hydroxyethylmethacrylate
4-HBA: 4-hydroxybutylacrylate
AA: acrylic acid
Crosslinking agent TDI-1: tolylene diisocyanate additive of trimethylolpropane Silane A-1:

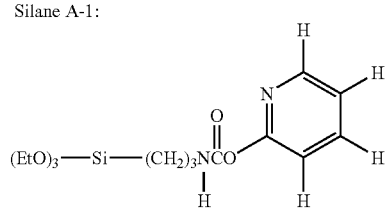

Silane A-2:

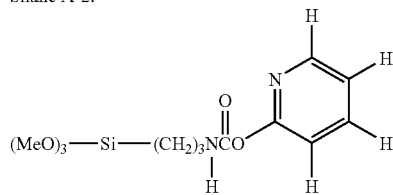

Silane B: Japanese Patent No. 3022993

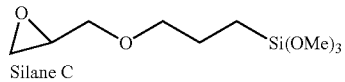

Silane C

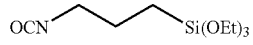

[Evaluation Test]
Durability

The polarizer (90 mm×170 mm) coated with the pressure sensitive adhesive prepared above was attached onto the both sides of glass substrate (110 mm×190 mm×0.7 mm), on which optical absorption axis was crossed. Approximately 5 kg/cm$^2$ of pressure was given in a clean room to prevent the generations of bubbles and impurities.

Those test samples were left at 60° C. under 90% relative humidity for 1,000 hours to investigate moisture and heat resistances by observing the generation of bubbles or edge lifting. The test samples were left at 80° C. for 1,000 hours to investigate heat resistance by observing the generation of bubbles or edge lifting. The test samples were left at room temperature for 24 hours right before the evaluation of the state of them, then the generation of bubbles or edge lifting was observed.

The evaluation criteria for durability are as follows.
○: No bubbles or edge lifting was observed.
□: A few bubbles or edge lifting was observed.
X: A large amount bubbles or edge lifting was observed.

Peel Strength

The polarizer coated with the pressure sensitive adhesive of the invention was aged at room temperature (23° C., 60% R.H) for 7 days. Each polarizer was cut into 1 inch×6 inch size fragments, and then adhered on 0.7 mm non-alkali glass by using a rubber roller in 2 kg of weight. Those test samples were left at room temperature for one hour, then initial peel strength was measured. The test samples were aged at 50° C. for 4 hours, and then left at room temperature for one hour. The peel strength was then measured.

In order to investigate the variations of peel strength under high temperature or high temperature and high humidity, the test samples were aged at 60° C. and at 60° C./90% RH, respectively, and then left at room temperature for one hour. The peel strength was then measured.

The peel strength was measured using a tensile testing machine by investigating the level of separation at the speed of 300 mm/min and an angle of 180° degree.

Removability

After adhering the polarizer (90 mm×170 mm) onto glass substrate (110 mm×190 mm×0.7 mm), the polarizer was separated one hour and 5 hours after the adhering (aging at 50° C. for 4 hours and leaving at room temperature for one hour), respectively.

The evaluation criteria for removability are as follows.
○: Separated with easy.
Δ: A little difficulty in separation.
X: Great difficulty in separation, glass might be destroyed.

Durability, peel strength, removability, and variations of peel strength under high temperature or high temperature and high humidity of the polarizer coated with the adhesives of the examples and comparative examples were investigated and the results are shown in Table 2.

TABLE 2

| | Peel strength (g/in) | | Durability | | |
|---|---|---|---|---|---|
| | Initial Peel strength | 50° C., 4 hr. 1 hr at room temperature | 80° C., 1000 hr | 60° C., 90% R.H. 1000 hr | Removability |
| Example 1 | 380 | 530 | ○ | ○ | ○ |
| Example 2 | 420 | 560 | ○ | ○ | ○ |
| Example 3 | 350 | 490 | ○ | ○ | ○ |
| Example 4 | 400 | 550 | ○ | ○ | ○ |
| Example 5 | 420 | 560 | ○ | ○ | ○ |
| Comparative Example 1 | 330 | 340 | x | x | ○ |
| Comparative Example 2 | 1000 | 1500 | ○ | ○ | x |
| Comparative Example 3 | 320 | 350 | ○ | Δ | ○ |

TABLE 3

| Peel stength (60° C.) | Ex.1 | Ex.2 | Ex.3 | Ex.4 | Ex.5 | Comparative Ex.1 | Comparative Ex.2 | Comparative Ex.3 |
|---|---|---|---|---|---|---|---|---|
| Early stage | 380 | 420 | 350 | 400 | 410 | 330 | 1000 | 320 |
| 2 hr | 450 | 500 | 420 | 460 | 490 | 440 | 1300 | 380 |
| 6 hr | 490 | 530 | 460 | 520 | 540 | 450 | 1970 | 410 |
| 1 day | 570 | 600 | 540 | 630 | 650 | 560 | 2000 | 530 |
| 3 days | 1060 | 1090 | 980 | 1050 | 1080 | 700 | 2760 | 780 |
| 6 days | 1660 | 1730 | 1580 | 1650 | 1700 | 670 | 3870 | 800 |
| 10 days | 2240 | 2330 | 2100 | 2230 | 2350 | 720 | 4060 | 790 |
| 15 days | 2600 | 2800 | 2300 | 2760 | 2840 | 750 | 4120 | 850 |
| 20 days | 2650 | 2960 | 2420 | 2770 | 2800 | 800 | 4860 | 900 |

TABLE 4

| Peel strength (60° C.) 90% R.H. | Ex.1 | Ex.2 | Ex.3 | Ex.4 | Ex.5 | Comparative Ex.1 | Comparative Ex.2 | Comparative Ex.3 |
|---|---|---|---|---|---|---|---|---|
| Early stage | 380 | 420 | 350 | 400 | 410 | 330 | 1000 | 320 |
| 2 hr | 430 | 520 | 410 | 430 | 450 | 580 | 1500 | 330 |
| 6 hr | 500 | 540 | 480 | 480 | 510 | 520 | 2000 | 400 |
| 1 day | 650 | 700 | 600 | 620 | 700 | 190 | 2540 | 440 |
| 3 days | 1000 | 1200 | 970 | 1020 | 1230 | 250 | 2670 | 450 |
| 6 days | 1630 | 1780 | 1420 | 1730 | 1890 | 290 | 4000 | 460 |
| 10 days | 2120 | 2290 | 2060 | 2080 | 2190 | 190 | 4250 | 560 |
| 15 days | 2200 | 2750 | 2090 | 2140 | 2310 | 270 | 4860 | 590 |
| 20 days | 2600 | 2890 | 2210 | 2540 | 2640 | 230 | 4960 | 480 |

As shown in Tables 2-4, the adhesives of Examples 1-5, compared with those of Comparative Examples 1-3, have greater removability owing to the low initial peel strength and excellent durability, suggesting that they adheres onto glass tightly even under high temperature and high humidity.

INDUSTRIAL APPLICABILITY

The acrylic pressure sensitive adhesive composition of the present invention has excellent removability owing to its low initial peel strength and excellent long-term durability since the peel strength onto glass is increasing under high temperature or high temperature and high humidity as time goes by.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An acrylic pressure sensitive adhesive composition containing a compound represented by the following formula 1:

[Formula 1]

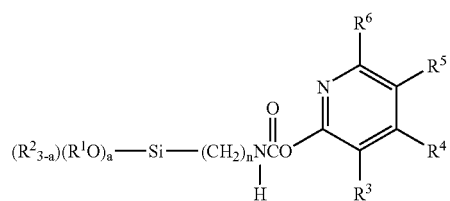

wherein, R1 and R2 are independently H or C1-C3 alkyl, a is an integer of 0-3, R3, R4, R5 and R6 are independently H or C1-C10 alkyl, alkoxyalkyl, and n is an integer of 1-3.

2. The acrylic pressure sensitive adhesive composition as set forth in claim 1, wherein the composition contains:
   a) 100 weight part of acrylic copolymer prepared by copolymerization of (meth)acrylic acid ester monomer having C1-C12 alkyl by 90-99.9 weight part and vinyl and/or acrylic monomer having a functional group capable of crosslinking by 0.1-10 weight part;
   b) 0.01-10 weight part of multifunctional crosslinking agent; and
   c) 0.01-9 weight part of silane compound having organic functional groups of urethane and pyridine represented in formula 1 of claim 1.

3. The acrylic pressure sensitive adhesive composition as set forth in claim 2, wherein the (meth)acrylic acid ester monomer of a) is at least one alkyl ester having C2-C8 atoms, which is selected from a group consisting of butyl (meth)acrylate, 2-ethylhexyl(meth)acrylate, ethyl(meth) acrylate, methyl(meth)acrylate, n-propyl(meth)acrylate, isopropyl(meth)acrylate, t-butyl(meth)acrylate, pentyl(meth) acrylate, n-octyl(meth)acrylate, isooctyl(meth)acrylate, isononyl(meth)acrylate and 2-ethylbutyl(meth)acrylate.

4. The acrylic pressure sensitive adhesive composition as set forth in claim 2, wherein the monomer having a functional group capable of crosslinking of a) is at least one selected from a group consisting of 2-hydroxyethyl(meth) acrylate, 2-hydroxypropyl(meth)acrylate, 4-hydroxybutyl (meth)acrylate, 2-hydroxyethyleneglycol(meth)acrylate, 2-hydroxypropyleneglycol(meth)acrylate, acrylic acid, methacrylic acid, acrylic acid dimer, itaconic acid, maleic acid and maleic anhydride.

5. The acrylic pressure sensitive adhesive composition as set forth in claim 2, wherein the multifunctional crosslinking agent of b) is at least one selected from a group consisting of isocyanate, epoxy, aziridine and metal chelate compounds.

6. The acrylic pressure sensitive adhesive composition as set forth in claim 1, wherein the crosslinking density of the acrylic pressure sensitive adhesive compound is 5-95%.

7. A pressure sensitive adhesive polarizer in which the acrylic pressure sensitive adhesive composition containing a compound represented by formula 1 is included in an adhesive layer on one side or both sides of a polarizing film.

8. The adhesive polarizer as set forth in claim 7, wherein the polarizer additionally contains one or more layers selected from a group consisting of protective layer, reflecting layer, phase retardation film, compensation film for wide view angle and brightness enhancing film.

9. A liquid crystal display containing liquid crystal panel in which the adhesive polarizer of claim 7 is adhered on one side or both sides of liquid crystal cell.

10. A liquid crystal display containing liquid crystal panel in which the adhesive polarizer of claim 8 is adhered on one side or both sides of liquid crystal cell.

* * * * *